United States Patent
Menebroker et al.

(10) Patent No.: US 7,222,691 B2
(45) Date of Patent: May 29, 2007

(54) WORK VEHICLE DOOR INTERLOCK WITH OVERRIDE POSITION

(75) Inventors: Troy C. Menebroker, Nixa, MO (US); Robert G. Draney, Derby, KS (US)

(73) Assignee: CNH America LLC, New Holland, PA (US)

( * ) Notice: Subject to any disclaimer, the term of this patent is extended or adjusted under 35 U.S.C. 154(b) by 369 days.

(21) Appl. No.: 10/992,373

(22) Filed: Nov. 18, 2004

(65) Prior Publication Data

US 2006/0102415 A1    May 18, 2006

(51) Int. Cl.
*B60K 28/12*    (2006.01)

(52) U.S. Cl. ..................................... 180/286

(58) Field of Classification Search ............... 180/286; 307/10.1, 10.6
See application file for complete search history.

(56) References Cited

U.S. PATENT DOCUMENTS

| | | | |
|---|---|---|---|
| 2,945,546 A | 7/1960 | Niederoest | |
| 3,993,157 A | 11/1976 | Schulte | |
| 4,058,740 A * | 11/1977 | Dalton et al. | 307/116 |
| 4,122,371 A * | 10/1978 | Talmage et al. | 315/84 |
| 4,397,371 A | 8/1983 | Lynnes et al. | |
| 4,429,761 A | 2/1984 | Haddock, Jr. et al. | |
| 4,480,713 A | 11/1984 | Macht et al. | |
| 4,673,054 A | 6/1987 | Burke et al. | |
| 4,709,776 A * | 12/1987 | Metz | 180/281 |
| 5,077,631 A * | 12/1991 | Cleary | 361/192 |
| 5,169,277 A | 12/1992 | Orser et al. | |
| 5,383,532 A | 1/1995 | Shonai et al. | |
| 6,206,073 B1 | 3/2001 | Lay | |
| 7,080,708 B2 * | 7/2006 | Wherley | 180/286 |
| 2003/0192732 A1 | 10/2003 | Warkentine | |
| 2004/0040773 A1* | 3/2004 | Kurttila | 180/286 |
| 2006/0087836 A1* | 4/2006 | Morris et al. | 362/155 |

* cited by examiner

*Primary Examiner*—Eric Culbreth
*Assistant Examiner*—Barry Gooden, Jr.
(74) *Attorney, Agent, or Firm*—Stephen A. Bucchianeri; John William Stader; Michael G. Harms

(57) ABSTRACT

A door interlock for a door of a work vehicle is provided, the door interlock including a switch, wherein the door interlock is movable between (a) an operating position in which the switch alternately indicates (1) that the door is open and (2) that the door is closed, and (b) an override position in which the switch indicates the door is closed regardless of the presence or absence of the door.

20 Claims, 6 Drawing Sheets

WORK VEHICLE DOOR INTERLOCK WITH OVERRIDE POSITION

FIELD OF THE INVENTION

The present invention generally relates to interlocks or switches for work vehicles. More particularly, it relates to door switches for work vehicles. Even more particularly, it relates to door switches for skid steer loaders that have override positions.

BACKGROUND OF THE INVENTION

Switches or interlocks are provided on many work vehicles to prevent the operation of the vehicle entirely, or to prevent the operation of particular subsystems of the vehicle under certain operating conditions.

These switches or interlocks (called "switches" hereinafter) are commonly attached to safety items like seatbelts or safety bars that extend in front of the operator. In these applications, the switches are always in use and cannot be overridden. In other applications, however, it may be desirable or even beneficial to permit the switches to be overridden. This application is directed to a switch configuration that permits the operator to override a switch when certain operating conditions occur.

Skid steer vehicles are very small, very compact, highly maneuverable construction vehicles for use in a wide variety of construction environments. Skid steer vehicles have a small, compact chassis with either two or three wheels supporting left and right sides of the vehicle. They typically have loader arms, which include either a single arm or multiple arms. The arms typically extend adjacent to the operator compartment on either side of the vehicle. The arms pivot up-and-down on the operator's left and right sides within 1 or 2 feet of the operator's shoulders. A bucket is typically fixed to the ends of the arms and extends across the front of the vehicle right in front of the operator, only a foot or two from his feet.

Since the loader arms and the bucket are disposed so closely to the operator, the operator compartment is typically designed to keep his hands, arms, legs, and feet away from the loader arms and the bucket. In the typical arrangement, the skid steer loader has a cage, commonly called a "ROPS", which surrounds the operator. The cage prevents the operator from reaching out to either the left or the right of the operator compartment toward the loader arms.

The operator typically enters a skid steer loader from the front through a front operator opening. Skid steer loaders have optional front doors that swing forward and away from the front operator opening. These front doors are optional in most skid steer vehicles, since the operator is typically restrained from exiting the front of the vehicle by a seat belt or safety bar.

Since the skid steer vehicle is so compact, however, the front door may interfere with the bucket or loader arms when it is opened. For this reason, a switch is provided to sense the door when the door is closed and in its proper operating position. In the skid steer vehicle illustrated herein, if the loader arms are lifted when the door is open, the loader arms will interfere with the door and damage it.

The door is provided on the skid steer vehicle as a comfort item and is not necessary for the operation of the vehicle. Skid steer operators using skid steer vehicles in extremely cold environments or extremely hot environments insist on operator compartment heating and operator compartment air-conditioning, respectively. This is only possible if the operator compartment is relatively airtight. To provide this airtight capability, clear glass or plastic sheets or windows are attached to the sides of the cage, and a door with a clear glass or plastic window is hingeably attached to the left or right post at the front of the operator compartment.

To enter the skid steer loader, the operator approaches the vehicle, climbs over the bucket (which extends side to side right in front of the operator compartment), grasps the door handle, and pivots the door forward about its hinges. The operator then steps into the operator compartment between two front posts, then closes and latches the door behind him. The operator then sits down in the vehicle, lowers the restraining bar and fastens his seat belt. The operator then starts the vehicle and drives away.

In prior art skid steer vehicles, a door switch was provided that would sense whether the door was open, or closed and latched. If, after entering the vehicle, the operator did not close and latch the door behind him, the switch would not be actuated and would not indicate the door was closed.

This door switch was coupled in series with the electrical coil of the loader lift arm control valve. Until the door was closed and the switch was actuated, it would block all electrical current to the loader lift arm control valve. The loader lift arm control valve would not work. Hence, the loader arms could not be raised or lowered. Until the door was closed, latched, and the switch actuated, the operator could not move the loader arms. This prevented the loader arms and bucket from damaging the door.

This arrangement had a significant limitation: the vehicle door could not be removed. For if the vehicle door were removed, there would be nothing to press against and actuate the switch. Since the switch could not be actuated, the loader arm circuit was disabled and would not permit the loader arms to be raised.

The system was modified to solve this problem by inserting a jumper into the electrical circuit of the switch. Since the door was unable to close the switch because the door was missing, the jumper would provide that capability by electrically connecting the two leads that extended from the vehicle wiring harness to the switch.

The drawback to this arrangement was that the operator had to remove body panels to gain access to the connector connecting the switch to the wiring harness. The operator had to disconnect this connector and replace it with another circuit element that would jumper the two wires together. This process was slow, painful, and not attractive to operators who were unfamiliar with electrical circuits.

What is needed, therefore, is a new system for overriding the door switch when the door is removed. What is also needed is a simple and easy to use process for overriding the door switch. What is also needed is a method of overriding the door switch that does not require the operator to remove body panels. What is also needed is an improved door switch arrangement that is capable of being overridden easily. It is an object of this invention to provide such a system and method.

SUMMARY OF THE INVENTION

In accordance with a first aspect of the invention, a work vehicle is provided that includes a chassis; at least four wheels coupled to the chassis to support the chassis for movement over the ground; an operator compartment mounted on the chassis, the operator compartment defining an operator door opening; an operator door pivotally coupled to the door opening; and a door switch assembly including a switch having an operating position and an override position, wherein the switch is operable in the operating position to indicate (1) the door is closed, and (2) the door is open, and further wherein the switch indicates the door is closed in the override position regardless of the presence or absence of the door.

The work vehicle may be a skid steer loader. The operator door opening may be a forward-facing opening disposed at the front of the operator compartment. The door switch may be a momentary contact switch that is mounted for rotation between the operating position and the override position. The operator compartment may include left front and right front posts, wherein the operator door opening may be disposed between the left front and right front posts, and further wherein the switch may be fixed to one of the left front and right front. The door switch assembly may include a switch bracket fixed to the switch, the switch bracket may adapt the switch to pivot about a pivotal axis from the override position to the operating position, and the door switch assembly may further include a detent to (1) hold the switch bracket in the override position, and (2) hold the switch bracket in the operating position.

In accordance with a second aspect of the invention, a door interlock for a door of a work vehicle is provided, including a momentary contact switch and a switch mount coupled to the switch, wherein the switch mount constraints the switch to move between (a) an operating position in which the switch alternately indicates (1) that the door is open and (2) that the door is closed, and (b) an override position in which the switch indicates the door is closed regardless of the presence or absence of the door.

The work vehicle may be a skid steer loader and may include an operator compartment, and the door may enclose a front opening in the operator compartment. The front opening may be defined between a left front post and a right front post of the operator compartment, and the switch and switch mount may be fixed to one of the left front post and the right front post. The switch mount may include a switch bracket that adapts the switch to pivot about a pivotal axis between the override position and the operating position. The switch mount may include a spring detent configured to engage the switch mount both when the switch is in the operating position, and when the switch is in the override position. The switch mount may be supported on pivot pins to pivot about a vertical axis. The switch may include a switch housing that supports a spring-loaded switch actuating pin, and the actuating pin may be disposed to abut a doorframe of the door when the door is closed.

In accordance with a third aspect of the invention, a door interlock for a door of a work vehicle is provided, the door interlock including means for switching and means for mounting the switching means to the work vehicle wherein the means for mounting constrain the switching means to move between (a) an operating position in which the switching means alternately indicates (1) that the door is open and (2) that the door is closed, and (b) an override position in which the switch indicates the door is closed regardless of the presence or absence of the door.

The door interlock may further include means for retaining the switching means in both the operating position and the override position. The means for mounting may include a means for adapting the switching means to pivot from the operating position to the override position, and mounting bracket means for pivotally supporting the means for adapting on the vehicle. The switching means may include means for actuating the switch.

These and other aspects of the invention will become apparent upon review of the detailed description, the figures, and the claims provided below.

DETAILED DESCRIPTION OF THE PREFERRED EMBODIMENTS

Figure 1:
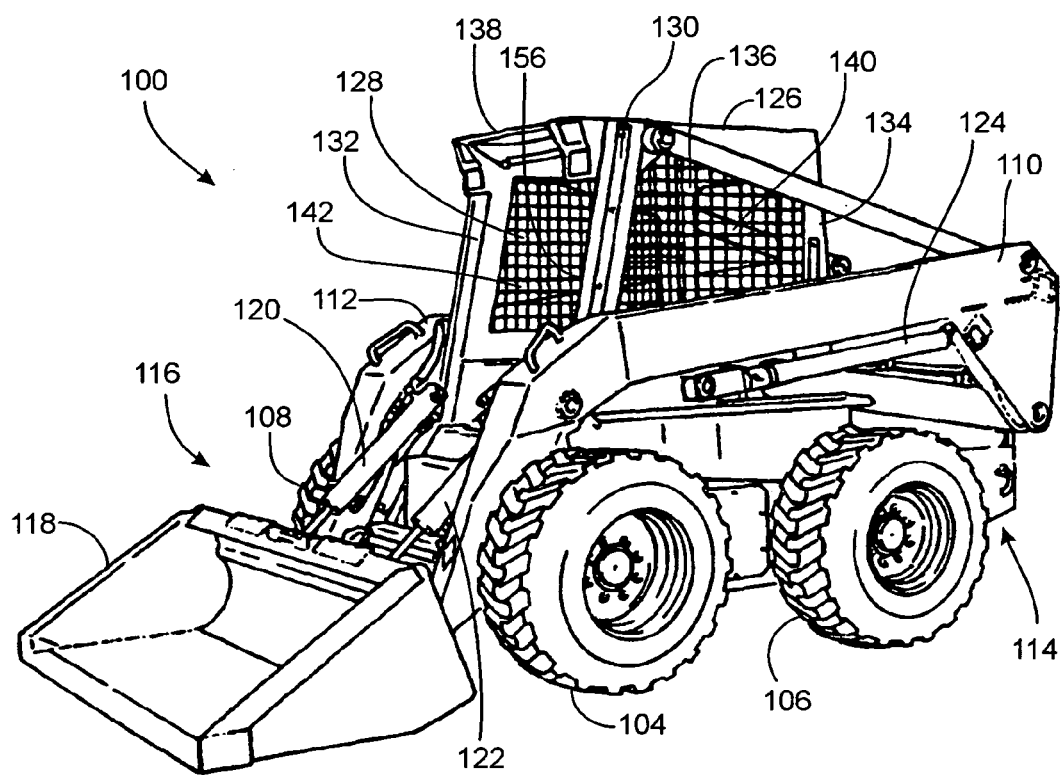
FIG. 1 is a perspective view of a work vehicle in accordance with the present invention.

While the present invention is susceptible of being made in any of several different forms, the drawings show a particularly preferred form of the invention. One should understand, however, that this is just one of many ways the invention can be made. Nor should any particular feature of the illustrated embodiment be considered a part of the invention, unless that feature is explicitly mentioned in the claims. In the drawings, like reference numerals refer to like parts throughout the several views.

Referring now to FIG. 1, a work vehicle 100 is illustrated, the work vehicle having a door switch assembly 156 that is movable between a first position, in which it is actuatable by a vehicle door, and a second position in which it is actuated by an adjacent bracket to constantly indicate the presence of the door even after it has been released.

Work vehicle 100 is a skid steer loader, which includes left front and left rear drive wheels 104, 106 and right front and right rear drive wheels. Only the right front drive wheel 108 is shown. The right rear drive wheel is disposed in the identical mirror image position as the left rear drive wheel.

Work vehicle 100 has left and right loader lift arms 110, 112. These arms extend from the rear 114 of the vehicle to the front 116 of the vehicle. A bucket 118 is fixed to and between the loader lift arms 110, 112. It is pivotally coupled to the loader lift arms to tilt forward and backwards when the bucket cylinders 120, 122 extend and retract. The loader lift arms raise and lower bucket 118 whenever the left and right lift arm cylinders extend and retract. Only the left side lift arm cylinder 124 is illustrated in FIG. 1. The right side lift arm cylinder is identically disposed and actuated to simultaneously raise the right side loader lift arm 112.

The operator sits, facing forward, in an operator's compartment 126 that is disposed between the left and right loader lift arms right behind the bucket 118. The operator enters and exits the operator compartment through the front 128 of the compartment, which is open in this FIGURE. The compartment itself is defined by four posts, a left front post 130, a right front post 132, a left rear post 134, and a right rear post 136. A roof 138 extends across and is fixed to all four posts. On each side of the operator compartment, extending between the left front post and the left rear post and between the right front post and the right rear post are two mesh screens: a left side mesh screen 140, and a right side mesh screen 142. The screens are made of heavy gauge steel, and typically (as shown here) are made of pierced steel plate. The holes pierced in these plates are sufficient to permit the operator to see clearly on either side of the vehicle. The plates are strong enough to keep stones or rocks out of the operator compartment. On occasion, such stones and rocks fall off the bucket, tumble to the roof 138 of the operator compartment 126, and, were it not for the mesh screens, would fall into the operator compartment and injure the operator. The mesh screens serve an additional function, and that is keeping the operator's body, and more particularly his hands and arms, away from the loader lift arms.

The front 128 of the compartment as shown in FIG. 1 is open. An open space is provided between left front post, the right front post, the roof, and the floor of the operator compartment. These function as an open doorway to the operator compartment. This is the preferred configuration for many operators when operating in the spring and fall or at other times and places when the ambient air is comfortable.

On occasion, however, and particularly in cold weather or hot weather, the operator wishes to be protected from the environment. If the temperatures are extreme, the operator may wish to be heated or cooled by a vehicle heating or air-conditioning system.

To permit this, vehicle 100 is modified, typically by placing sheets of glass or plastic over the mesh screens on the side, a sheet of glass or plastic over the rear opening, and a door that supports a glass or plastic window over the front 128 of vehicle 100. With these additions, the vehicle is rendered substantially airtight, permitting the effective use of a heating system or an air-conditioning system.

Figure 2:
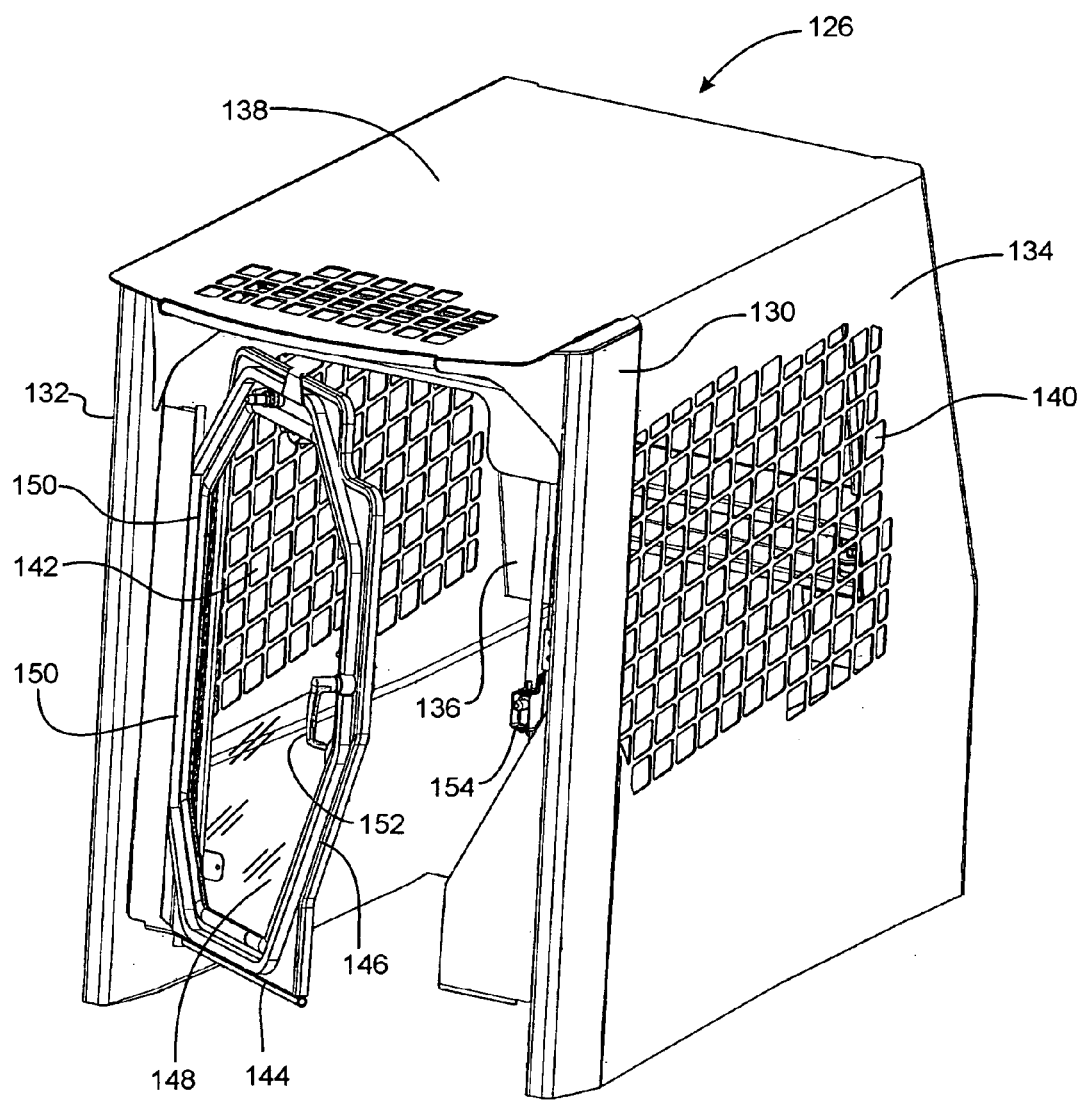
FIG. 2 is a perspective view of the operator compartment of the vehicle of FIG. 1 including a door and a door switch responsive to the presence and absence of the door.

FIG. 2 illustrates the various components of the operator compartment 126, showing its left front post 130, right front post 132, left rear post 134, right rear post 136, and roof 138. Left and right mesh screens 140 and 142 are also shown.

FIG. 2 also illustrates door 144 that includes a generally rectangular doorframe 146, transparent window 148, which is surrounded and supported by doorframe 146, right side door hinges 150, which hingeably support the door to the right front post 132, and door handle 152, which is fixed to the left hand side of doorframe 146.

FIG. 2 also illustrates a door switch 154, which is fixed to left front post 130. The switch is actuated by door 144 whenever the door is closed completely. When the operator swings door 144 closed, the doorframe 146 pivots backwards and engages switch 154. This engagement causes switch 154 to change state (i.e. the switch will close) and indicate that the door is closed. When switch 154 is engaged (e.g. the switch is actuated or closed), it conducts electrical current transmitted from the operator controls (not shown) to the loader lift arm cylinder valve. In sum, whenever the door is closed, the operator can raise or lower the lift arms and bucket. When the door is open, the operator cannot raise and lower the lift arms and bucket.

Alternative Switch Arrangements

Door switch assembly 156 has two alternative configurations, one configuration shown in FIGS. 3-8, and the other configuration shown in FIGS. 9-14.

In the first switch assembly configuration, shown in FIGS. 3-8, the switch is pivoted between two positions: a first, normal operating position (FIGS. 3-5) in which the switch indicates the presence or absence of the door, and a second override position (FIGS. 6-8) in which the switch indicates the presence of the door even when the door is open or missing entirely.

Figure 3:
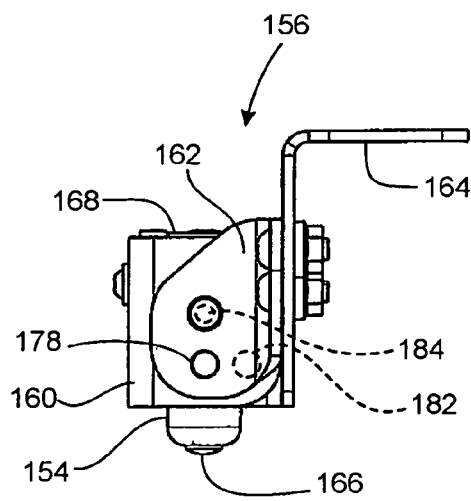
FIG. 3 is plan view of a first door switch assembly for use in FIG. 2. The first door switch assembly is in an un-actuated position. The door switch is not compressed by the door and therefore indicates that the door is absent or not closed.
Figure 4:
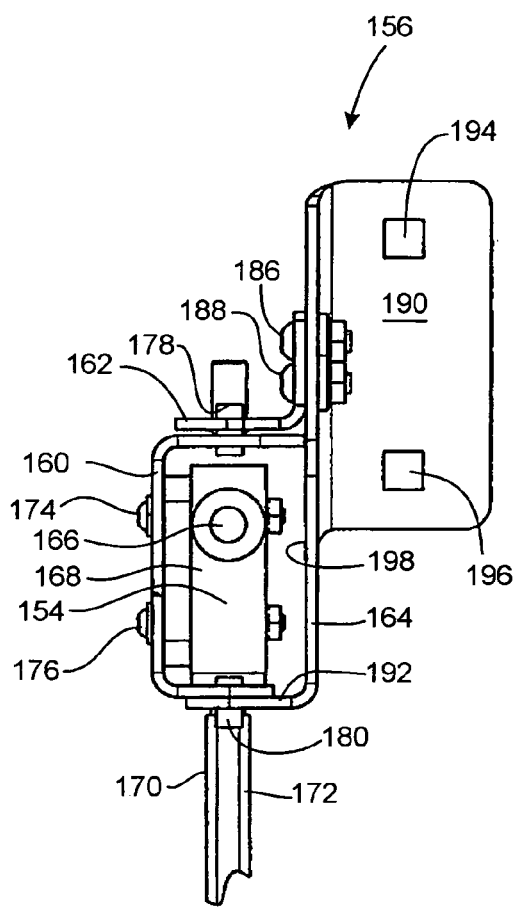
FIG. 4 is a front view of the first switch assembly of FIG. 3 showing how the switch is mounted within its pivotable housing.
Figure 5:
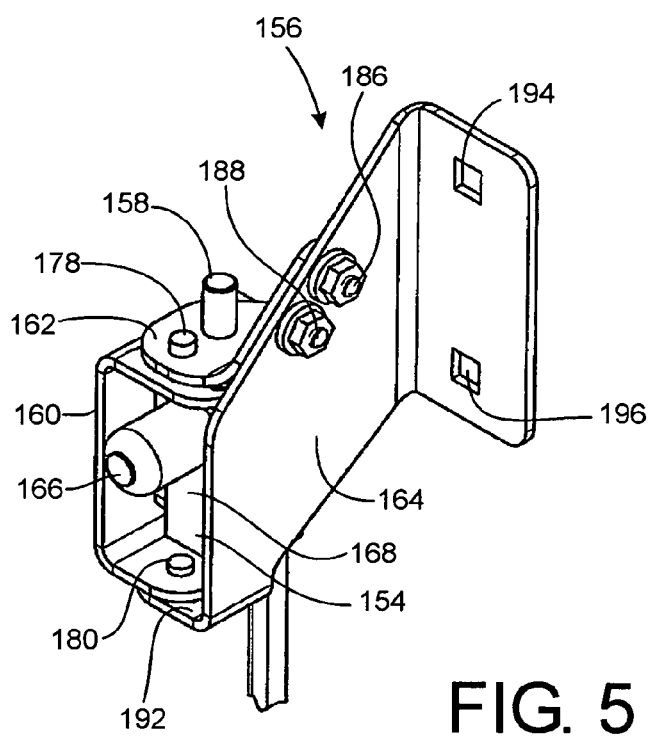
FIG. 5 is a perspective view of the first switch assembly of FIGS. 3-4.

In the switch operating position shown in FIGS. 3-5, the door actuates switch 154 when it is closed, and switch 154 is not actuated when the door is open.

Figure 6:
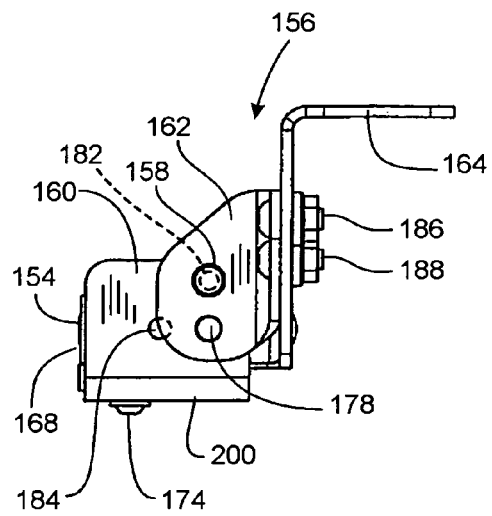
FIG. 6 is plan view of the first door switch assembly of FIGS. 3-5 shown in a switch-pivoted position. In this position, the first switch indicates the presence of the door even when the door is absent or not closed.
Figure 7:
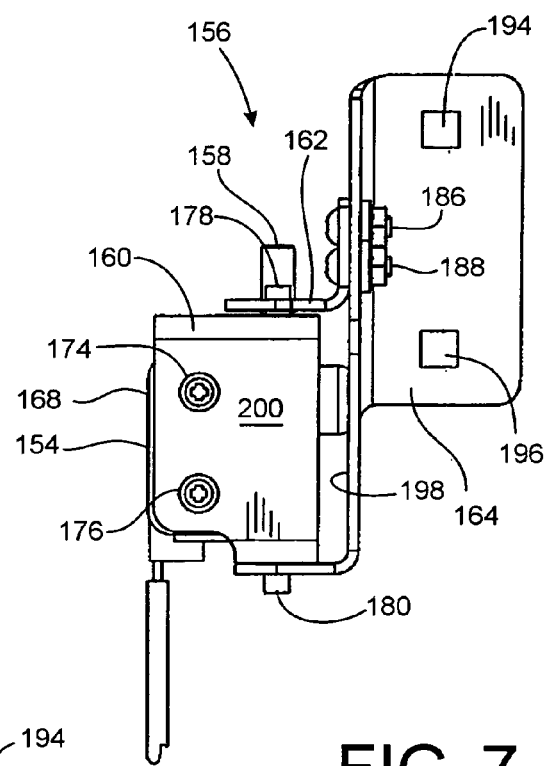
FIG. 7 is a front view of the first door switch assembly of FIG. 6.
Figure 8:
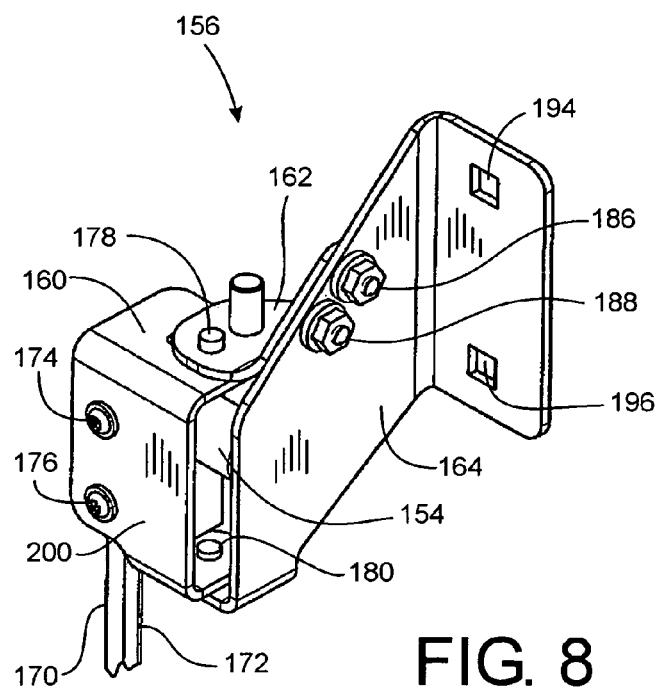
FIG. 8 is a perspective view of first switch assembly of FIGS. 6-7.

In the switch override position shown in FIGS. 6-8, switch 154 is always actuated. In this always-actuated override position, switch 154 always indicates the presence of the door, even when the door is open or removed.

In the second switch assembly configuration, shown in FIGS. 9-14, the switch is stationary, and a switch cover is pivoted between two positions: a first, normal operating position (FIGS. 9-11) in which the switch indicates the presence or absence of the door, and a second override position (FIGS. 12-14) in which the switch indicates the presence of the door when the door is open or missing entirely.

Figure 9:
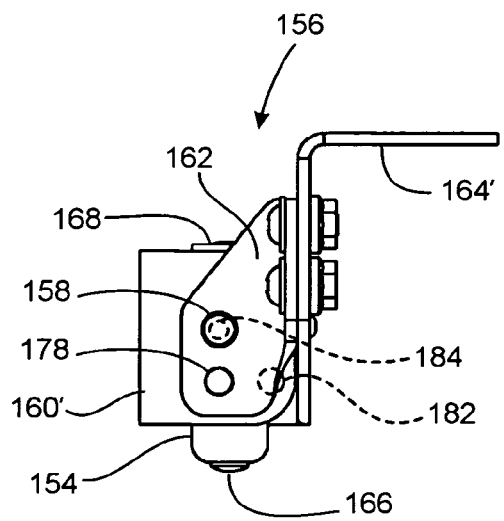
FIG. 9 is plan view of an alternative second door switch assembly for use in FIG. 2. The second door switch assembly in shown in an un-actuated position. The door switch is not compressed by the door and therefore indicates that the door is absent or not closed.
Figure 10:
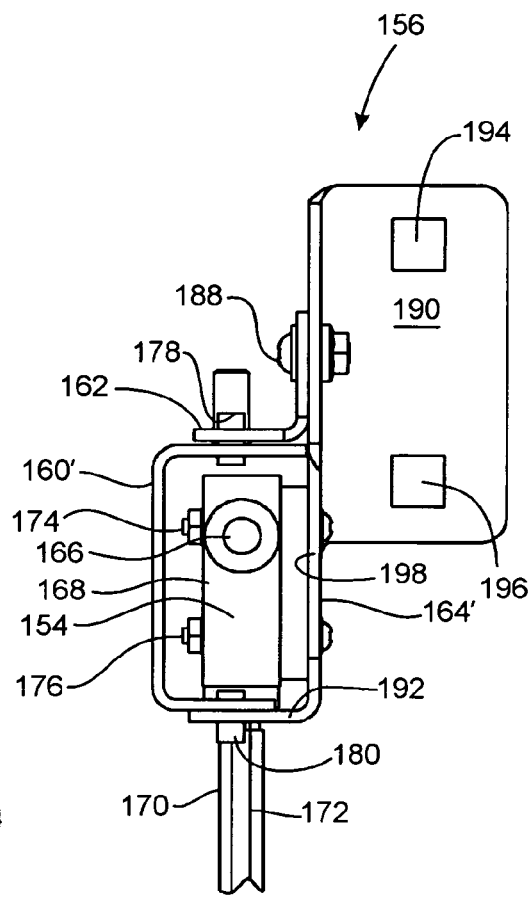
FIG. 10 is a front view of the second door switch assembly of FIG. 9.
Figure 11:
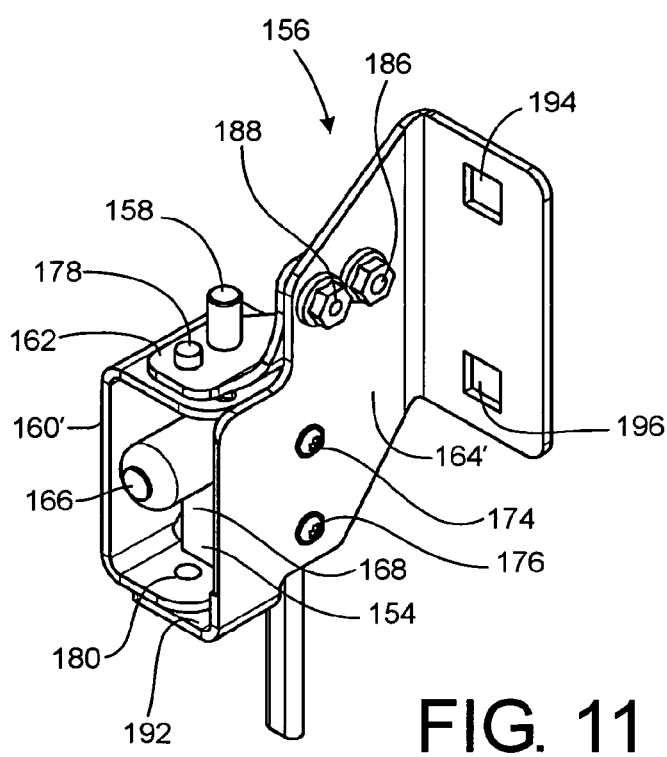
FIG. 11 is a perspective view of the second door switch assembly of FIGS. 9-10.

In the switch cover operating position shown in FIGS. 9-11, the door actuates switch 154 when it is closed, and switch 154 is not actuated when the door is open.

Figure 12:
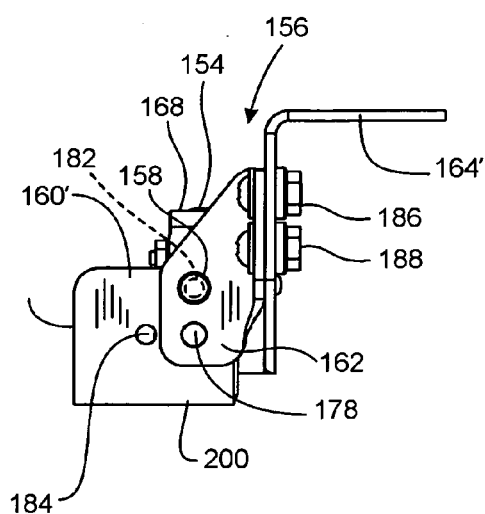
FIG. 12 is plan view of the second door switch assembly of FIGS. 9-11 shown with a switch cover pivoted to actuate the switch. In this position, the switch indicates the presence of the door even when the door is absent or not closed.
Figure 13:
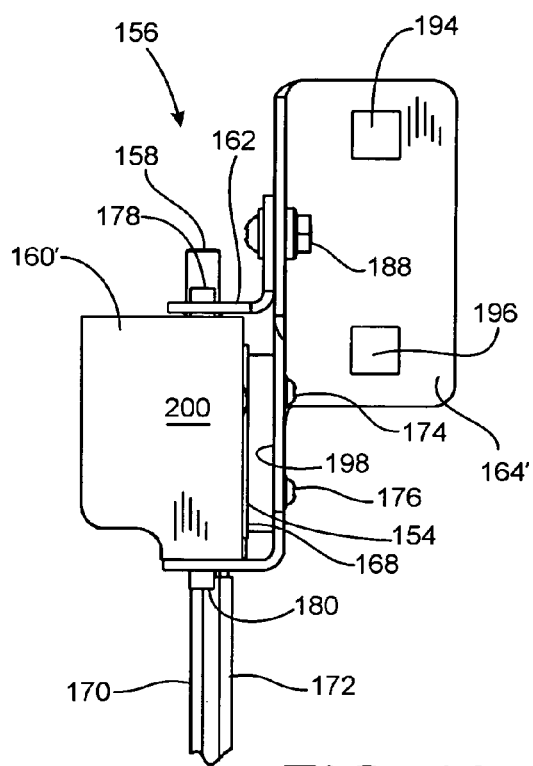
FIG. 13 is a front view of the second door switch assembly of FIG. 12.
Figure 14:
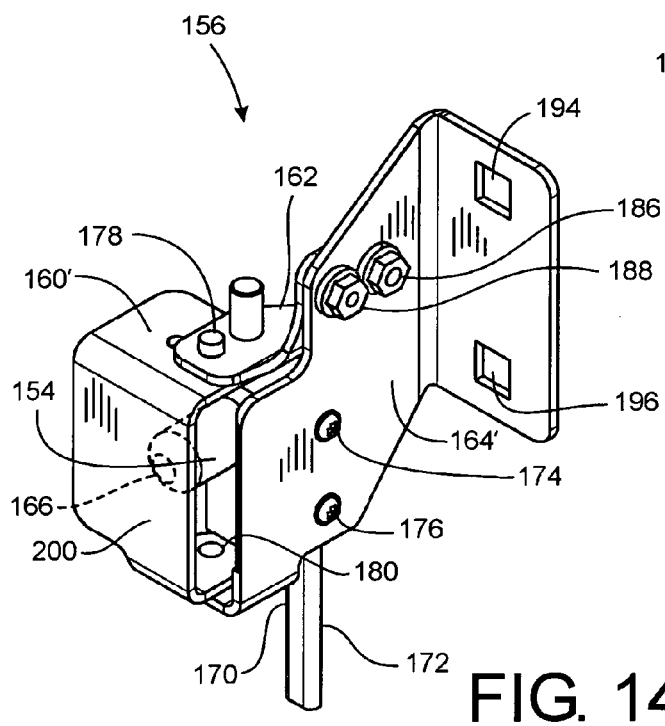
FIG. 14 is a perspective view of the second door switch assembly of FIGS. 12-13.

In the switch cover override position shown in FIGS. 12-14, switch 154 is always actuated. In this always-actuated override position, switch 154 always indicates the presence of the door, even when the door is open or removed.

First Alternative Switch Assembly (FIGS. 3-8)

Switch 154 is shown in detail together with its mounting hardware in FIGS. 3-8. FIGS. 3-5 illustrate the switch 154 together with its mounting hardware in a first position in which the switch responds to and indicates both the presence and absence of the door. FIG. 6-8 illustrate the switch and its mounting hardware in a second position in which the switch is always engaged (e.g. actuated or closed) thereby indicating the presence of the door—that the door is closed—even when the door is absent, missing, removed, or not closed.

Referring now to FIGS. 3-8, door switch assembly 156 includes a switch 154 coupled to a switch mount, the switch mount including a spring-loaded detent 158 (preferably a ball or pin detent), a switch bracket 160, an upper switch support 162 and a combined a mounting bracket and lower switch support (hereinafter "mounting bracket") 164.

Switch 154 is a momentary contact switch that is spring biased in its switch open position with switch actuating pin 166 extended outward away from the switch body 168.

Actuating pin 166 has a throw of about one-half inch and is supported in switch body 168.

With the switch in the position shown in FIGS. 3-5, when the door closes it pushes pin 166 in approximately a half an inch until the switch is engaged (e.g. actuated or closed). This closure makes a connection between the two wires 170, 172 that extend from switch body 168. These two wires are coupled in series with the control circuit providing electrical power to the loader lift arm control valve coil (not shown).

An interlock switch such as switch 154 could be used in a variety of different ways on the work vehicle. For example, wires 170, 172 can be coupled to a microprocessor or other circuit that senses the position of the switch, and, under digital program control, performs some operation. The other operations can include, for example, disabling or enabling the bucket, disabling or enabling the loader lift arms, disabling or enabling the engine ignition, or disabling or enabling the starting circuit of the vehicle.

In another alternative configuration, wires 170, 172 can be coupled directly to a particular valve or other actuator (as they are herein with the loader lift arm control valve coil) to either enable or disable the operation of that valve or other actuator. In another alternative embodiment, the switch can be a normally closed switch that is opened whenever the door is closed. In this configuration, current would pass through switch 154 until the door was closed. Once the door was closed, this electrical current flow would be interrupted.

While the switch is shown mounted to the middle of the left front post 130, it could be repositioned to either the left or right front post, or the roof, or adjacent to the floor of the operator compartment near the door. While the switch is shown here as a simple mechanical switch, it could be a proximity switch, a reed switch, an optical switch, a Hall-effect switch, or other similar switch configured to indicate the presence or absence of the door.

Switch 154 is fixed to switch bracket 160 by a pair of screws 174, 176. Switch bracket 160 is C-shaped, formed of bent sheet metal. It adapts switch 154 to be manually pivoted about a vertical axis with respect to left front door post 130. Switch bracket 160 is supported on two hinge pins, an upper hinge pin 178, and a lower hinge pin 180. Upper hinge pin 178 extends between and pivotally couples an upper portion of switch bracket 160 to upper switch support 162. Lower hinge pin 180 extends between and pivotally couples mounting bracket 164 to a lower portion of switch bracket 160.

Hinge pins 178, 180 are disposed in a vertical relationship to each other and together define a vertical axis about which switch 154 and bracket 160 pivot with respect to upper switch support 162 and mounting bracket 164.

Upper switch support 162 includes an L-shaped bracket to which ball detent 158 is fixed. Ball detent 158 has a downwardly extending ball (not shown) that engages the upper surface of switch bracket 160. Switch bracket 160 has two holes 182, 184 that are disposed to receive and retain the ball of ball detent 158. These holes are disposed at 90° angles with respect to the pivotal axis defined by pivot pins 178, 180. When hole 184 is engaged with the ball of ball detent 158, the switch is in the position shown in FIGS. 3-5. When hole 182 is engaged with the ball of ball detent 158, the switch is in the position shown in FIGS. 6-8.

The detent is selected such that an operator can grasp switch 154 and switch bracket 160, rotate them from the normal operating position to the override position and vice versa. In addition, when the operator releases switch 154 and bracket 160, the switch will stay in position. Ball detent 158 is strong enough to hold switch 154 in both of its pivotal positions.

Upper switch support 162 is fixed to mounting bracket 164 by two screws 186, 188. Screws 186, 188 are inserted through holes formed in upper switch support 162, and extend through corresponding holes in mounting bracket 164. Nuts are threaded on the free ends of screws 186, 188 and tightened. This arrangement fixes upper switch bracket 160 to mounting bracket 164.

Mounting bracket 164 is formed of sheet metal with two bends. The upper bent portion, which is generally vertical, forms a planar mounting surface 190 that is configured to be fixed to left front post 130. The lower bent portion, which is generally horizontal, defines a generally horizontal surface 192 that supports the bottom of switch support 162. Mounting bracket 164 is fixed to left front post 130 by threaded fasteners (not shown) that extend through mounting holes 194, 196.

Operation of the First Switch Assembly

When the door is on the vehicle, such as shown in FIG. 2, the operator places the switch in its normal operating position in which it is actuated by door 144. This switch position is shown in FIGS. 3-5. In these FIGURES, the switch actuating pin 166 extends forward, toward the door, and generally perpendicular to the inside surface of the door. The pin is unrestricted in its movement and extends outward to its full length when door 144 is open. When the operator closes the door, the inside surface of door frame 146 presses against the free end of pin 166, depressing it, and forcing the pin back into the body of switch 154. This movement causes switch 154 to close. When switch 154 closes, the switch conducts electricity from the operator controls (not shown) through the switch and thence into the loader lift arm control valve coil. With the door closed and the switch depressed, the operator can raise and lower the loader lift arms at will using the operator controls.

When the door is off the vehicle, such as shown in FIG. 1, there is no door to depress switch 154 and make the electrical connection between the operator controls and the control valve. In the prior art, the operator had to remove the body panel, locate the end of wires 170, 172, disconnect the switch, and insert a jumper in place of the switch to complete the circuit to the loader lift arm control valve. Using the present switch arrangement, all the operator has to do is grasp switch 154 and switch bracket 160, and rotate them from the position shown in FIGS. 3-5 (in which hole 184 is engaged to detent 158) to the position shown in FIGS. 6-8 (in which hole 182 is engaged to detent 158).

When the operator rotates switch 154 and switch bracket 160, actuating pin 166 engages inner surface 198 (see FIGS. 4, 7) of mounting bracket 164. The switch, switch bracket, and mounting bracket, are dimensioned such that this rotation through 90° will depress pin 166 and close switch 154. With switch 154 in this override position, even though there is no door (or, alternatively, the door is open and not closed), switch 154 is nonetheless closed, thereby indicating (falsely) that the door is present and closed. In sum, by rotating the switch to the position shown in FIG. 6-8, the door interlock function of the switch is overridden. Thus, the operator need not open a body panel, or connect and disconnect electrical circuits in order to override the switch and provide electrical current to the loader lift arm control valve coil.

Once the seasons change and the weather gets either too hot or too cold, the operator may wish to re-attach the door. With the door attached and the operator compartment sealed, the operator can either heat or air condition the operator compartment as he desires.

If the operator attaches the door and does not rotate the switch from the FIG. 6-8 override position to the FIG. 3-5 operating position, there is some risk that the operator might raise the loader lift arms and damage the door while it is open. To reduce the chance that this will happen, the switch bracket 160 is dimensioned to prevent the door from closing completely. When the operator closes the door, the doorframe 146 abuts surface 200 of switch bracket 160. This lack of closure is noticeable to the operator. It draws his attention to the fact that he must reverse switch 154 from the FIG. 6-8 override position back to the FIG. 3-5 operating position.

Second Alternative Switch Assembly (FIGS. 9-14)

Switch 154 is shown in detail together with its mounting hardware in a second switch arrangement shown in FIGS. 9-14. FIGS. 9-11 illustrate the switch 154 together with its mounting hardware in a first position in which the switch responds to and indicates both the presence and absence of the door. FIG. 12-14 illustrate the switch 154 and its mounting hardware in a second position in which the switch is always engaged (e.g. actuated or closed) thereby indicating the presence of the door—that the door is closed—even when the door is absent, missing, removed, or not closed.

The arrangement of FIGS. 9-14 is identical to that of FIGS. 3-8 with some small differences.

In the first embodiment of FIGS. 3-8, switch 154 is attached to a C-shaped structure called switch bracket 160 with fasteners 174, 176. In the second embodiment of FIGS. 9-14, switch 154 is not attached to switch bracket 160 with fasteners 174, 176, but is attached to bracket 164 with fasteners 174, 176 instead. For this reason, switch bracket 160 as it is shown in FIGS. 9-14 is identified as switch cover 160', and mounting bracket 164 of FIGS. 3-8 is identified as mounting bracket 164' in FIGS. 9-14.

The foregoing differences are the only differences between the embodiment of FIGS. 3-8 and the embodiment of FIGS. 9-14. In all other respects, the two embodiments are constructed identically and function identically.

Referring now to FIGS. 9-14, door switch assembly 156 includes a switch 154 coupled to a mounting bracket 164' with fasteners 174, 176, a switch cover 160', pivotally mounted to cover and uncover switch 154, upper switch cover support 162, the switch cover support including a spring-loaded detent 158 (preferably a ball or pin detent); and a combined switch mounting bracket and lower switch cover support (hereinafter "mounting bracket") 164'.

Switch cover 160' has holes 182, 184, as described above, that engage detent 158 in the manner described above when pivoted through an angle of 90°. Detent 158 engages hole 184 to hold switch cover 160' in its operating position. Detent 158 engages hole 182 to hold switch cover 160' in its override position. When switch cover 160' is pivoted to its override position, it compresses actuating pin 166 of switch 154, thereby actuating switch 154.

Operation of the Second Switch Assembly

When the door is on the vehicle, such as shown in FIG. 2, the operator places the switch cover 160' in its normal operating position, uncovering switch 154, which permit switch 154 to be actuated by door 144. This switch cover position is shown in FIGS. 9-11. In FIGS. 9-11, the switch actuating pin 166 extends forward, toward the door, and generally perpendicular to the inside surface of the door. The pin is unrestricted in its movement and extends outward to its full length when door 144 is open. When the operator closes the door, the inside surface of door frame 146 presses against the free end of pin 166, depressing it, and forcing the pin back into the body of switch 154. This movement causes switch 154 to close. When switch 154 closes, the switch conducts electricity from the operator controls (not shown) through the switch and thence into the loader lift arm control valve coil. With the door closed and the switch depressed, the operator can raise and lower the loader lift arms at will using the operator controls.

When the door is missing, however, all the operator has to do is grasp switch cover 160' and rotate it from the position shown in FIGS. 9-11 (in which hole 184 is engaged to detent 158) to the position shown in FIGS. 12-14 (in which hole 182 is engaged to detent 158).

When the operator rotates switch cover 160', switch cover 160' engages actuating pin 166, presses it, and actuates switch 154. The switch, switch cover, and mounting bracket to the are dimensioned such that this rotation of switch cover 160' through 90° will depress pin 166 and close switch 154.

This position of the door switch assembly 156 and switch cover 160' is called the "override position" since it overrides the normal operation of switch 154 and generates a "door closed" even when the door is missing.

With switch cover 160' in this override position, even though there is no door (or, alternatively, the door is open and not closed), switch 154 is nonetheless closed, thereby indicating (falsely) that the door is present and closed. In sum, by rotating switch cover 160' to the position shown in FIG. 12-14, the door interlock function of the switch is overridden. Thus, the operator need not open a body panel, or connect and disconnect electrical circuits in order to override the switch and provide electrical current to the loader lift arm control valve coil.

Once the seasons change and the weather gets either too hot or too cold, the operator may wish to re-attach the door. With the door attached and the operator compartment sealed, the operator can either heat or air condition the operator compartment, as he desires.

If the operator attaches the door and does not rotate the switch cover 160' from the FIG. 12-14 override position to the FIG. 9-11 operating position, there is some risk that the operator might raise the loader lift arms and damage the door while it is open. To reduce the chance that this will happen, the switch cover 160' is dimensioned to prevent the door from closing completely. When the operator closes the door, the doorframe 146 abuts the outer surface of switch cover 160'. This lack of closure is noticeable to the operator. It draws his attention to the fact that he must reverse switch 154 from the FIG. 12-14 override position back to the FIG. 9-11 operating position.

One will appreciate that the present disclosure is intended as an exemplification of the invention, and is not intended to limit the invention to the specific embodiment illustrated. The disclosure is intended to cover by the appended claims all such modifications as fall within the scope of the claims.

We claim:

1. A work vehicle comprising:
   a self-propelled chassis;
   an operator compartment fixed to the chassis, the operator compartment defining an operator door opening;
   an operator door pivotally and removably coupled to the chassis to cover the door opening; and
   a door switch assembly including a switch, the door switch assembly having an operating position and an override position, wherein the switch is operable in the operating position to indicate one of (1) the door is closed, and (2) the door is open, and further wherein the switch indicates the door is closed in the override position regardless of the presence or absence of the door.

2. The work vehicle of claim 1, wherein the work vehicle is a skid steer loader.

3. The work vehicle of claim 1, wherein the operator door opening is a forward-facing opening disposed at the front of the operator compartment.

4. The work vehicle of claim 1, wherein the door switch is a momentary contact switch that is mounted for rotation between the operating position and the override position.

5. The work vehicle of claim 1, wherein the operator compartment includes left front and right front posts, wherein the operator door opening is disposed between the left front and right front posts, and further wherein the switch is fixed to one of the left front and right front posts.

6. The work vehicle of claim 1, wherein the door switch assembly includes a switch bracket fixed to the switch, the switch bracket adapting the switch to pivot about a pivotal axis from the override position to the operating position, the door switch assembly further including a detent to (1) hold the switch bracket in the override position, and (2) hold the switch bracket in the operating position.

7. The work vehicle of claim 1, further comprising at least four wheels to support the chassis for movement over the ground.

8. A door interlock for a door of a work vehicle comprising:
a momentary contact switch and a switch mount coupled to the switch, wherein the switch mount constrains the switch to move between (a) an operating position in which the switch alternately indicates (1) that the door is open and (2) that the door is closed, and (b) an override position in which the switch indicates the door is closed regardless of the presence or absence of the door.

9. The door interlock of claim 8, wherein the work vehicle is a skid steer loader and includes an operator compartment, and further wherein the door encloses a front opening in the operator compartment.

10. The door interlock of claim 9, wherein the front opening is defined between a left front post and a right front post of the operator compartment, and further wherein the switch and switch mount are fixed to one of the left front post and the right front post.

11. The door interlock of claim 8, wherein the switch mount includes a switch bracket that adapts the switch to pivot about a pivotal axis between the override position and the operating position.

12. The door interlock of claim 11, wherein the switch mount further includes a spring detent configured to engage the switch mount both when the switch is in the operating position, and when the switch is in the override position.

13. The door interlock of claim 12, wherein the switch mount is supported on pivot pins to pivot about a substantially vertical axis.

14. The door interlock of claim 8, wherein the switch includes a switch housing that supports a spring loaded switch actuating pin, and further wherein the actuating pin is disposed to abut a door frame of the door when the door is closed.

15. A door interlock for a door of a work vehicle, the door interlock comprising means for switching and means for mounting the switching means to the work vehicle wherein the means for mounting constrains the switching means to move between (a) an operating position in which the switching means alternately indicates (1) that the door is open and (2) that the door is closed, and (b) an override position in which the switch indicates the door is closed regardless of the presence or absence of the door.

16. The door interlock of claim 15, further comprising means for retaining the switching means in both the operating position and the override position.

17. The door interlock of claim 16, wherein the means for mounting includes a means for adapting the switching means to pivot from the operating position to the override position, and mounting bracket means for pivotally supporting the means for adapting on the vehicle.

18. The door interlock of claim 15, wherein the switching means includes means for actuating the switch.

19. A door interlock for a door of a work vehicle, the door interlock comprising:
means for switching that is configured to alternately indicate (1) that the door is open and (2) that the door is closed; and
means for overriding the switching means to indicate the presence of the door regardless of the actual presence or absence of the door;
wherein the means for overriding further includes a means pivotable with respect to the switching means for actuating the switching means.

20. The door interlock of claim 19, wherein the switching means includes a means for actuating the switch, and further wherein the means pivotable is configured to mechanically engage the means for actuating the switch.

* * * * *